US010627422B2

(12) United States Patent
Endres

(10) Patent No.: US 10,627,422 B2
(45) Date of Patent: Apr. 21, 2020

(54) ERROR REPORTING AT A PULSE LEVEL LYING BELOW THE POWER SUPPLY LEVEL

(71) Applicant: Continental Teves AG & Co. oHG, Frankfurt (DE)

(72) Inventor: Ralf Endres, Groß-Gerau (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 361 days.

(21) Appl. No.: 15/450,785

(22) Filed: Mar. 6, 2017

(65) Prior Publication Data

US 2017/0205441 A1  Jul. 20, 2017

Related U.S. Application Data

(63) Continuation of application No. PCT/EP2015/069570, filed on Aug. 26, 2015.

(30) Foreign Application Priority Data

Sep. 5, 2014  (DE) .......................... 10 2014 217 834

(51) Int. Cl.
*G01P 21/02* (2006.01)
*B60T 8/171* (2006.01)
(Continued)

(52) U.S. Cl.
CPC .............. *G01P 21/02* (2013.01); *B60T 8/171* (2013.01); *B60T 8/885* (2013.01); *G01P 3/48* (2013.01);
(Continued)

(58) Field of Classification Search
CPC ..... G01D 5/24466; G01P 3/487; G01P 3/489; G01P 21/02; B60T 8/885; B60T 2270/416
See application file for complete search history.

(56) References Cited

U.S. PATENT DOCUMENTS

| 4,750,126 A * | 6/1988 | Bleckmann | ............. B60T 8/885 318/383 |
| 2003/0093188 A1 * | 5/2003 | Morita | ................ B60C 23/0408 701/1 |

(Continued)

FOREIGN PATENT DOCUMENTS

| DE | 19812486 A1 | 9/1999 |
| DE | 19833116 A1 | 2/2000 |

(Continued)

OTHER PUBLICATIONS

International Search Report and Written Opinion dated Nov. 17, 2015 from corresponding International Patent Application No. PCT/EP2015/069570.

(Continued)

Primary Examiner — Xin Y Zhong

(57) ABSTRACT

A method for transmitting error information of a sensor, in a signal exchanged between the sensor and a master receiver, said signal being designed with a minimum level for supplying electric power to the sensor and carrying measurement data. One disclosed method involves identifying the error in the sensor; switching off a component of the sensor consuming electric power; and transmitting the error information at an error level lying below the minimum level.

19 Claims, 3 Drawing Sheets

(51) Int. Cl.
  *B60T 8/88* (2006.01)
  *G01P 3/48* (2006.01)
  *G01D 5/16* (2006.01)
  *G01D 18/00* (2006.01)
(52) U.S. Cl.
  CPC .......... *B60T 2270/416* (2013.01); *G01D 5/16* (2013.01); *G01D 18/00* (2013.01)

(56) References Cited

U.S. PATENT DOCUMENTS

| | | | |
|---|---|---|---|
| 2004/0066183 A1* | 4/2004 | Lohberg | B60T 8/171 324/166 |
| 2007/0223165 A1 | 9/2007 | Itri et al. | |
| 2008/0204308 A1* | 8/2008 | Mayer | G01S 7/4021 342/195 |

FOREIGN PATENT DOCUMENTS

| | | |
|---|---|---|
| DE | 10146949 A1 | 6/2002 |
| DE | 102011080789 A1 | 2/2012 |
| DE | 102011056362 A1 | 6/2012 |
| WO | WO2007017523 A1 | 2/2007 |

OTHER PUBLICATIONS

German Search Report dated Aug. 26, 2015 for corresponding German Patent Application No. 10 2014 217 834.7.

* cited by examiner

ERROR REPORTING AT A PULSE LEVEL LYING BELOW THE POWER SUPPLY LEVEL

CROSS-REFERENCE TO RELATED APPLICATION

This application claims the benefit of PCT Application PCT/EP2015/069570, filed Aug. 26, 2015, which claims priority to German Application DE 10 2014 217 834.7, filed Sep. 5, 2014. The disclosures of the above applications are incorporated herein by reference.

TECHNICAL FIELD

The invention relates to transmitting an item of error information in a signal supplying a sensor with electrical energy to a control apparatus.

BACKGROUND

DE 10 2011 080 789 A1 discloses a vehicle in which wheel speed sensors for sensing the wheel speed of the individual wheels are installed. These wheel speed sensors are active wheel speed sensors and transmit their measurement data in the form of wheel speeds to an evaluation device via a cable as the transmission path.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF SUMMARY

An object of the invention is to improve the transmission of the measurement data.

A superordinate receiving device is preferably understood as meaning an external receiving device, in particular an electronic control unit or an electronic control device of a motor vehicle system or a motor vehicle control system, for example a motor vehicle brake system.

According to one aspect, a method for transmitting an item of error information describing an error in a sensor in a signal, which is interchanged between the sensor and a superordinate receiving device and is set up with a minimum level for supplying electrical energy to the sensor and for carrying measurement information, comprises the steps of: detecting the error to be transmitted in the sensor, switching off a component of the sensor which consumes electrical energy, and transmitting the error with an error level below the minimum level.

This is based on the consideration that, in order to comply with high safety standards, incorrect measurement information and errors in the signal processing inside the sensor need to be detected and accordingly need to be taken into account during their processing in a superordinate receiving device. The incorrect measurement information or the error in the signal processing inside the sensor could be detected in the sensor which captures the measurement information and transmits it to the superordinate receiving device.

However, for reasons of costs, use is generally made of two-wire lines which both supply the sensor with electrical energy and interchange the measurement information. In order to be able to likewise include the error information describing the error in the signal, signal states outside the normal usage range would have to be defined for the error signal, which signal states would either entail an unacceptable power consumption or cannot be achieved on account of a particular basic power consumption of the functional blocks during normal operation of the sensor. The minimum level defines this basic power consumption and is therefore a basic consumption level or an energy supply level for supplying electrical energy to the sensor. If the sensor is connected to a current interface, the minimum level can be defined as a standardized normal current level, for example.

Reliable measurement information can no longer be captured anyway in the event of an error in the sensor, with the result that this information actually no longer has to be transmitted on account of the fact that it cannot be used by the receiving device. For this reason, certain electronic components actually also do not need to be operated at all in the error state of the sensor and can therefore be switched off. In this manner, the power consumption of the sensor then falls, with the result that the electrical energy supply for the sensor is also safeguarded when the signal transmits the error information using signal states and therefore error levels which could not be achieved during normal operation of the sensor.

Switching off at least one component of the sensor which consumes electrical energy in the event of an error makes it possible to transmit error information describing errors to the receiving device, which error information can be distinguished from the measurement information, with the result that the receiving device can then accordingly react to the error in the sensor. In this case, that component of the sensor which consumes electrical energy can be arbitrarily selected and, for example, can comprise parts of a signal processing circuit for entering the measurement information in the signal.

In one development, the error is transmitted in a pulse which is kept at the error level over a predetermined length of time. Keeping the pulse at the error level means that the receiving device can clearly define this pulse as error information and can therefore distinguish it from signal fluctuations which possibly occur.

In an additional development, the measurement information in the signal can be described with measurement pulses between the minimum level and a second, measurement pulse level above the minimum level. This makes it possible to transmit, for example, time-dependent measurement information, such as speeds from a speed sensor, in a particularly robust manner. The higher the speed, the more measurement pulses occur here over a predetermined reference period. In this case, the generation of the measurement pulses on the basis of the speed can be carried out in any desired manner and is not restricted to a particular measurement principle.

In one particular development, the transmission of the measurement pulses is suppressed if the error to be transmitted has been detected in the sensor. A component of the sensor which consumes the electrical energy and generates the measurement pulses can then be accordingly switched off in order to reduce the electrical energy consumption of the sensor within the scope of the stated method. However, this is only one possible way of reducing the electrical energy consumption of the sensor. A further possibility would be, for example, to switch off a component of the sensor for error monitoring if no further error monitoring is considered to be necessary in the event of a detected error.

However, if the transmission of the measurement pulses is suppressed in the event of an error, in one preferred development of the stated method, a check can be carried out in the event of an error in order to determine whether the error to be transmitted is still present before each transmission of a measurement pulse. The corresponding component for error monitoring should then expediently remain switched on in the event of an error.

Alternatively or additionally, the sensor can be restarted after the error has been transmitted with the error level. This makes it possible to attempt to eliminate the error by re-initializing the sensor, the full range of functions then also being fully available again for error diagnosis after the restart. If the error is still present and is sensed by the error monitoring, the process can be carried out again.

Yet another development, comprises the steps of: storing the error in a memory before that component of the sensor which consumes electrical energy is switched off, and interrupting an electrical energy supply for the memory in order to switch off that component of the sensor which consumes electrical energy.

In this case, the memory should expediently be non-volatile. Switching off the memory makes it possible to reduce a further electrical energy consumption in order to effectively carry out the stated method.

According to another aspect, a control apparatus is set up to carry out one of the methods.

In one development of the control apparatus, the apparatus has a memory and a processor. In this case, one of the methods is stored in the memory in the form of a computer program and the processor is provided for the purpose of carrying out the method when the computer program is loaded into the processor from the memory.

According to another aspect, a computer program comprises program code means for carrying out all steps of one of the stated methods when the computer program is executed on a computer or one of the control apparatuses.

According to another aspect, a computer program product contains a program code which is stored on a computer-readable data storage medium and carries out one of the methods when it is executed on a data processing device.

According to another, a sensor comprises one of the control apparatuses.

In a special development, the sensor is a wheel speed sensor.

According to another aspect, a vehicle comprises one of the wheel speed sensors.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The above-described properties, features and advantages of this invention and the manner in which they are achieved become clearer and more clearly comprehensible in connection with the following description of the exemplary embodiments which are explained in more detail in connection with the drawings, in which.

DETAILED DESCRIPTION

In the Figures, identical technical elements are provided with identical reference symbols and are described only once.

Figure 1:
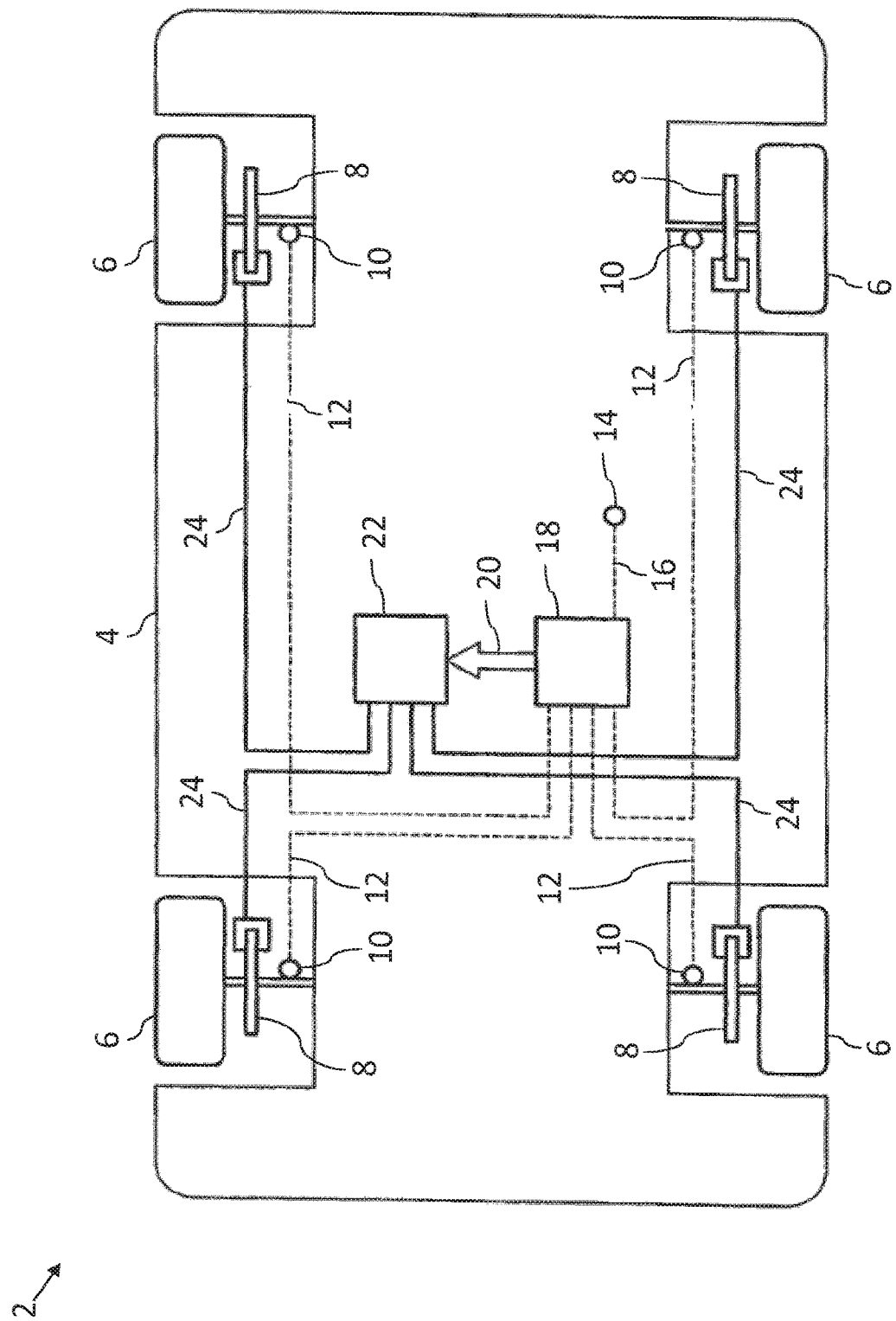
FIG. 1 shows a schematic view of a vehicle having a vehicle dynamics control system.

Reference is made to FIG. 1 which shows a schematic view of a vehicle 2 having a vehicle dynamics control system which is known per se. Details of this vehicle dynamics control system can be gathered from DE 10 2011 080 789 A1, for example.

The vehicle 2 comprises a chassis 4 and four wheels 6. Each wheel 6 can be decelerated with respect to the chassis 4 via a brake 8 fastened to the chassis in a stationary manner in order to decelerate a movement of the vehicle 2 on a road (not illustrated any further).

In this case, it may happen, in a manner known to a person skilled in the art, that the wheels 6 of the vehicle 2 lose their traction and the vehicle 2 even moves away from a trajectory, which is predefined using a steering wheel (not shown any further) for example, as a result of understeering or oversteering. This is avoided by means of control circuits which are known per se such as ABS (anti-lock braking system) and ESP (electronic stability program).

In the present embodiment, the vehicle 2 has speed sensors 10 on the wheels 6 for this purpose, which sensors sense a speed 12 of the wheels 6. The vehicle 2 also has an inertial sensor 14 which captures vehicle dynamics data 16 relating to the vehicle 2, which data may comprise, for example, a pitch rate, a roll rate, a yaw rate, a transverse acceleration, a longitudinal acceleration and/or a vertical acceleration in a manner known per se to a person skilled in the art.

On the basis of the sensed speeds 12 and captured vehicle dynamics data 16, an evaluation apparatus in the form of a controller 18 can determine, in a manner known to a person skilled in the art, whether the vehicle 2 is sliding on the road or even deviates from the predefined trajectory mentioned above and can accordingly react to this with a controller output signal 20 which is known per se. The controller output signal 20 can then be used by an actuating device 22 to activate actuators, such as the brakes 8, by means of actuating signals 24, which actuators react to the sliding and the deviation from the predefined trajectory in a manner known per se.

The present invention is intended to be illustrated in more detail using one of the speed sensors 10 shown in FIG. 1 even though the present invention can be implemented on any desired sensors, for example the inertial sensor 14.

Figure 2:
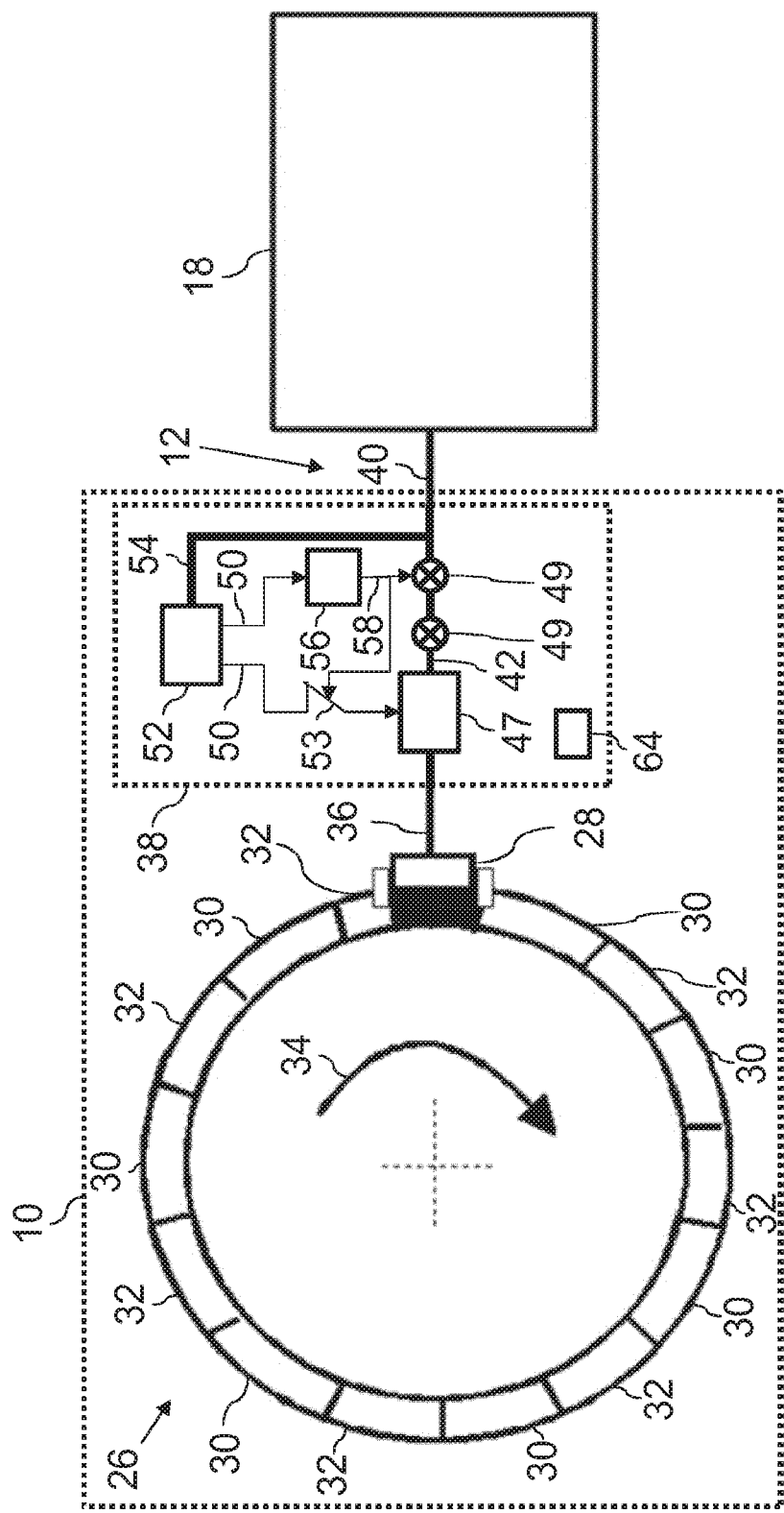
FIG. 2 shows a schematic view of a wheel speed sensor in the vehicle from FIG. 1.

Reference is made to FIG. 2 which shows a schematic view of one of the speed sensors 10 in the vehicle dynamics control system from FIG. 1.

In the present embodiment, the speed sensor 10 is in the form of an active speed sensor which comprises an encoder disk 26, which is fastened to the wheel 6 in a rotationally fixed manner, and a reading head 28 which is fastened in a stationary manner with respect to the chassis 4.

In the present embodiment, the encoder disk 26 consists of magnetic North poles 30 and magnetic South poles 32 which are strung together and together excite a transmitter magnetic field (not illustrated any further). If the encoder disk 26 fastened to the wheel 6 rotates with the latter in a direction of rotation 34, the transmitter magnetic field accordingly concomitantly rotates in a synchronous manner.

In the present embodiment, the reading head 28 is a magnetostrictive element which changes its electrical resistance on the basis of the angular position of the transmitter magnetic field excited by the encoder wheel 26.

Figure 3:
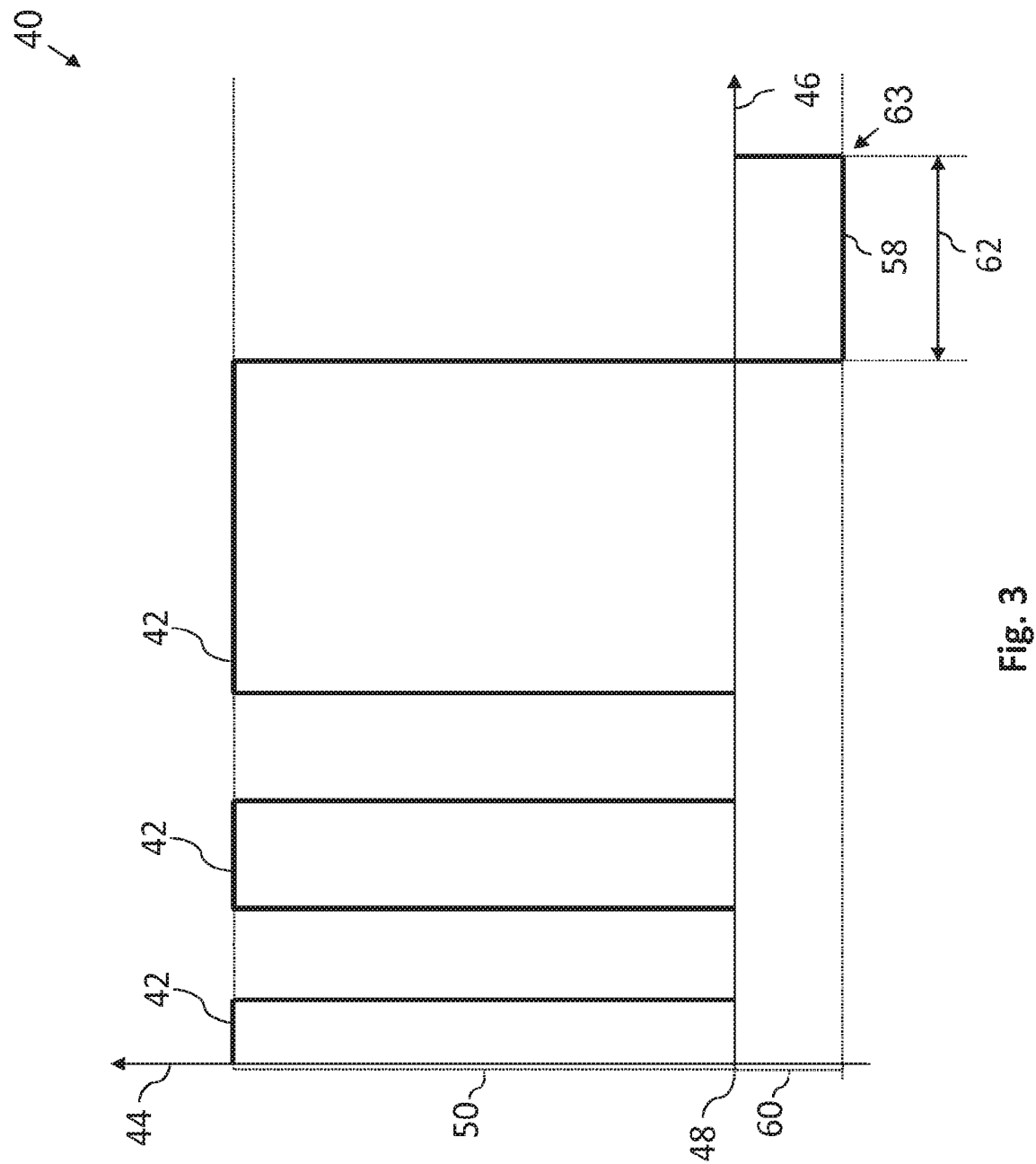
FIG. 3 shows a graph having an output signal from the wheel speed sensor from FIG. 2.

In order to sense the speed 12, the change in the angular position of the encoder wheel 26, and therefore the change in the electrical resistance of the reading head 28, is sensed. For this purpose, the reading head 28 may be connected, in a manner known per se, to a resistance measuring circuit (not illustrated any further), for example a bridge circuit known per se. A periodic output signal, called speed transmitter signal 36 below, is generated in the resistance measuring circuit on the basis of the electrical resistance of the reading head 28. A pulse signal 40 which depends on the speed 12 and is shown in FIG. 3 can be generated in a signal preprocessing circuit 38 downstream of the reading head 28 on the basis of the speed transmitter signal 36 and can be output to the controller 18. With respect to this and with respect to further background information on active wheel speed sensors, reference is made to the relevant prior art, for example DE 101 46 949 A1.

The generation of the pulse signal 40 in the signal preprocessing circuit 38 shall be additionally briefly explained below using FIG. 3 in which the pulse signal 40 containing measurement pulses 42 is plotted in a signal 44/time 46 graph. The signal 44 and therefore the pulse signal 40 may be a current signal in this case. Frequency modulation per se is already given by the measurement method in the above-mentioned speed sensor 10, the measurement pulses 42 being able to be generated in a pulse generation device 47 of the signal preprocessing circuit 38 and being able to be modulated onto the pulse signal 40 via a mixer 49.

Starting from a particular reference signal value 48, the measurement pulses 42 have a predetermined first height 50. Within the scope of the frequency modulation, the number of measurement pulses 42 over time 46 is determined by the measured value to be transmitted for the speed 12, which means that the number of measurement pulses 42 increases with increasing speed 12. Therefore, in FIG. 3, the pulse signal 40 is shown in a state in which the speed 12 falls over time 46 and the number of measurement pulses 42 decreases over a particular period.

Within the scope of the present embodiment, the electrical energy 50 needed to generate the measurement pulses 42 is provided by an electrical energy supply circuit 52 via a switch (yet to be described) in the form of a normally closed contact 53. The electrical energy supply circuit 52 takes the input energy 54 required for this purpose from the pulse signal 40, the necessary input energy 54 being fed into the pulse signal 40 by the controller 18 in a manner known per se, for example within the scope of an offset current.

The signal preprocessing circuit 38 also has an error monitoring device 56. The task of this error monitoring device 56 is to detect malfunctions and to report them to the controller 18 so that the latter can accordingly react to them. With the measurement pulses 42 from a defective speed sensor 10, the controller 18 in the vehicle dynamics control system described using FIG. 1 could incorrectly interpret a yaw rate which is not present, for example, and at which the vehicle 2 rotates about its vertical axis. The controller 18 would then intervene via the controller output signal 20 and would impose a yaw behavior on the vehicle 2 in order to counteract the yaw rate which is not present. Since this is highly dangerous to traffic, defective speed sensors 10 should be detected, for which the error monitoring device 56 is respectively provided.

The error monitoring device 56 is also operated with electrical energy from the electrical energy supply circuit 52. The error monitoring device 56 may be in the form of a watchdog known per se, for example, analyzes the function of the speed sensor 10 and monitors it for errors. If an error occurs, the error monitoring device 56 outputs an error pulse 58 which can likewise be modulated onto the pulse signal 40 via a mixer 49.

So that the controller 18 can also identify the error pulse 58 as such, an error pulse height 60 which differs from the height of the measurement pulses 42 must be selected for the error pulse. For good detectability by the controller 18, the error pulse 58 should fall below the reference signal value 48 and should be held there for a predetermined period 62. In principle, this period 62 can be held for any desired time. However, it should last until the controller 18 can also clearly distinguish the error pulse 58 from random signal value fluctuations.

The problem here is that the error pulse 58 with its error pulse height 60 reduces the input energy 54. The reference signal value 48 is expediently selected as the minimum signal value or minimum level in such a manner that a permanent electrical energy supply for all components of the speed sensor 10 and, in particular, of the signal processing circuit 38 is ensured. If the pulse signal 40 permanently falls below the reference signal value 48, like in the error pulse 58, the electrical energy supply for the speed sensor 10 and, in particular, for the signal processing circuit 38 can collapse.

Since the metrological use of the measurement pulses 42 is doubtful in the event of an error, it is proposed within the scope of the present embodiment to reduce the electrical energy consumption of the speed sensor 10 and, in particular, of the signal processing circuit 38. For this purpose, the normally closed contact 53 is controlled using the error pulse 58, for example. Alternatively, however, the error monitoring device 56 can also control the normally closed contact 53 using its own signal. This interrupts the electrical energy supply 50 for the pulse generation device 47 and stops the generation of the measurement pulses 42. The electrical energy consumption of the speed sensor 10 consequently falls and its function is still ensured by the error pulse 58 despite the pulse signal 40 which has fallen below the reference signal value 48.

On the basis of the error pulse 58, a restart 63 of the speed sensor 10 can then also be initiated at the end of the period 62 in order to attempt to eliminate the error. With the restart 63, the period 62 for transmitting the error pulse 58 could be automatically ended. Alternatively or additionally, the error may also be stored in a memory 64 which is only indicated in FIG. 2.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method for transmitting sensor error information in a signal comprising:
    detecting the error information in the sensor;
    switching off a component of the sensor which consumes electrical energy; and transmitting the error information to a superordinate receiving device having a minimum level for supplying electrical energy to the sensor, wherein the error information is transmitted with an error level below the minimum level.

2. The method of claim 1, further comprising transmitting the error information in a pulse which is kept at the error level over a predetermined length of time.

3. The method of claim 1, further comprising describing measurement information in the signal with measurement pulses between the minimum level and a second, measurement pulse level above the minimum level.

4. The method of claim 3, further comprising suppressing the transmission of a measurement pulse when the error information to be transmitted has been detected in the sensor.

5. The method of claim 4, further comprising performing a check when the error to be transmitted has been detected, and wherein the check determines whether the error is still present before each transmission of a measurement pulse.

6. The method of claim 1, comprising restarting the sensor after the error information has been transmitted with the error level.

7. The method of claim 1, further comprising storing the error information in memory before the component is switched off.

8. The method of claim 7, further comprising switching off the component by interrupting an electrical energy supply for the memory.

9. The method of claim 1, wherein the component of the sensor which consumes electrical energy comprising parts of a signal processing circuit for entering measurement information in the signal.

10. A sensor comprising a control apparatus having instructions for:
   detecting error information in the sensor;
   switching off a component of the sensor which consumes electrical energy; and
   transmitting the error information to a superordinate receiving device having a minimum level for supplying electrical energy to the sensor, wherein the error information is transmitted with an error level below the minimum level.

11. The sensor of claim 10, further comprising transmitting the error information in a pulse which is kept at the error level over a predetermined length of time.

12. The sensor of claim 10, further comprising describing measurement information in the signal with measurement pulses between the minimum level and a second, measurement pulse level above the minimum level.

13. The sensor of claim 12, further comprising suppressing the transmission of a measurement pulse when the error information to be transmitted has been detected in the sensor.

14. The sensor of claim 13, further comprising performing a check when the error to be transmitted has been detected, and wherein the check determines whether the error is still present before each transmission of a measurement pulse.

15. The sensor of claim 10, further comprising restarting the sensor after the error information has been transmitted with the error level.

16. The sensor of claim 10, further comprising storing the error information in memory before the component is switched off.

17. The sensor of claim 16, further comprising switching off the component by interrupting an electrical energy supply for the memory.

18. The sensor of claim 10, wherein the component of the sensor which consumes electrical energy comprising parts of a signal processing circuit for entering measurement information in the signal.

19. The sensor of claim 10, wherein the sensor is a wheel speed sensor.

* * * * *